United States Patent [19]

Kuo et al.

[11] Patent Number: 4,480,090
[45] Date of Patent: Oct. 30, 1984

[54] PROCESS FOR ESTERIFICATION OF CELLULOSE USING AS THE CATALYST THE COMBINATION OF SULFURIC ACID, PHOSPHORIC ACID AND A HINDERED ALIPHATIC ALCOHOL

[75] Inventors: Chung-Ming Kuo; Alan P. Leonard, both of Kingsport, Tenn.

[73] Assignee: Eastman Kodak Company, Rochester, N.Y.

[21] Appl. No.: 544,187

[22] Filed: Oct. 21, 1983

[51] Int. Cl.$^3$ ................................................ C08B 3/02
[52] U.S. Cl. ..................................... 536/58; 252/182; 536/59; 536/62; 536/63; 536/64; 536/65; 536/67; 536/68; 536/69; 536/70; 536/71; 536/73; 536/74
[58] Field of Search ............. 252/182; 536/58, 59, 536/62–65, 67–71, 73, 74

[56] References Cited

U.S. PATENT DOCUMENTS

| | | | |
|---|---|---|---|
| 1,683,347 | 9/1928 | Gray et al. | 536/73 |
| 2,193,033 | 3/1940 | Malm et al. | 536/69 |
| 2,254,652 | 9/1941 | Hiatt et al. | 536/70 |
| 2,353,255 | 7/1944 | Malm et al. | 536/69 |
| 2,759,924 | 8/1956 | Touey | 536/62 |
| 2,861,069 | 11/1958 | Touey et al. | 536/68 |
| 4,306,060 | 12/1981 | Ikemoto | 536/69 |

FOREIGN PATENT DOCUMENTS

| | | | |
|---|---|---|---|
| 542733 | 6/1957 | Canada | 536/59 |
| 568439 | 4/1945 | United Kingdom | 536/64 |

Primary Examiner—Ronald W. Griffin
Attorney, Agent, or Firm—Clyde L. Tootle; Daniel B. Reece, III

[57] ABSTRACT

The present invention relates to a method of preparing lower fatty acid esters of cellulose which comprises esterifying at a temperature of between about 75° C. and about 110° C. a cellulose compound having esterifiable hydroxyl groups with an esterifying bath comprising an organic acid anhydride, a diluent, and a catalyst comprising from 0.2 to 2.0 parts phosphoric acid, from 0.1 to 1.2 parts sulfuric acid, and from 0.05 to 0.6 parts of a hindered aliphatic alcohol by weight per 100 parts of the cellulose to be esterified.

7 Claims, No Drawings

PROCESS FOR ESTERIFICATION OF CELLULOSE USING AS THE CATALYST THE COMBINATION OF SULFURIC ACID, PHOSPHORIC ACID AND A HINDERED ALIPHATIC ALCOHOL

DESCRIPTION

The present invention relates to a method of preparing lower fatty acid esters of cellulose which comprises esterifying at a temperature of between about 75° C. and about 110° C. a cellulose compound having esterifiable hydroxyl groups with an esterifying bath comprising an organic acid anhydride, a diluent, and a catalyst comprising from 0.2 to 2.0 parts phosphoric acid, from 0.1 to 1.2 parts sulfuric acid, and from 0.05 to 0.6 parts of a hindered aliphatic alcohol by weight per 100 parts of the cellulose to be esterified.

In the preparation of lower fatty acid esters of cellulose, the catalyst used is generally sulfuric acid. This acid is very effective in that it promotes the desired esterification of the cellulose under relatively mild conditions. However, it can combine with the cellulose, and the cellulose ester product obtained often contains some sulfuric acid residues. Ordinarily these sulfuric acid residues can be largely removed from the final product by a prolonged hydrolysis under very carefully controlled conditions. However, even after this prolonged treatment, the product may still contain sufficient combined sulfuric acid to make the cellulose ester unstable to prolonged heating at elevated temperatures such as may be encountered in molding operations or the like. In addition, the commercial process using sulfuric acid catalyst requires considerable cooling to maintain the reaction temperature below that at which excessive molecular weight degradation occurs.

Heretofore, in order to eliminate these disadvantages of sulfuric acid catalyst, various other and "noncombining" catalysts have been suggested for cellulose esterification processes. Perchloric acid is an example of such a catalyst. However, perchloric acid has several disadvantages. For example, it is corrosive to stainless steel equipment and is explosive in contact with readily oxidizable materials.

According to U.S. Pat. No. 2,861,069, other strong acid catalysts such as phosphoric acid, hydrochloric acid, methanesulfonic acid, toluenesulfonic acid, and the like are useful as noncombining catalysts in the esterification of cellulose. In addition, weak salts of strong acids such as zinc chloride, ammonium sulfate, and the like have been suggested. These are not in general commercial use, however, for various reasons. Some of these noncombining catalysts (e.g., hydrochloric acid) are too corrosive to permit their use in stainless steel equipment, while others (e.g., zinc chloride) require too much catalyst (50 to 100% based on weight of cellulose) for efficient reaction.

Certain sulfonic acids (e.g., para-toluenesulfonic acid) required large amounts of catalyst (up to 50% based on weight of cellulose) and high quality wood pulps with high alpha-cellulose content to obtain an acceptable quality product.

Heretofore, in order to improve the process to produce cellulose esters it has been proposed to use smaller amounts of sulfuric acid catalyst and at higher or elevated (about 75° C.) temperatures. However, while these esters contain lower amounts of combined sulfuric acid residues than conventionally-produced esters, these esters have excessive molecular weight loss which occurs during esterification.

Therefore, it would be a major advance in the state of the art to provide a process for esterifying cellulose using sulfuric acid as catalyst which provides esterified cellulose, decreases the sulfuric acid residues and decreases the degradation of molecular weight of the esterified cellulose.

In accordance with the present invention, we have discovered that a hindered secondary or tertiary aliphatic alcohol in combination with a mixture of sulfuric and phosphoric acids provides an esterification catalyst which decreases the amount of both the sulfuric acid residues and molecular weight degradation which occur during the esterification reaction. The use of the hindered alcohol containing catalyst also enables acceptable quality cellulose ester to be produced from lower alpha-cellulose content, viscose and paper grade pulps, than can be obtained with either (1) the sulfuric acid alone or (2) in combination with phosphoric acid as the catalyst or (3) the sulfuric acid and hindered alcohol as the catalyst. In addition, the novel catalyst comprising sulfuric acid, phosphoric acid and a hindered alcohol enables the esterification reaction to be easily controllable and reproducible, and the ester produced is more homogeneous. Also, the ester product has less color, is of higher and more controllable molecular weight, and is more stable to prolonged exposure to elevated temperatures.

The catalyst composition of this invention provides a process for preparing lower fatty acid esters of cellulose which comprises esterifying at a temperature between 75° C. and 110° C., preferably 90° C. to 105° C., a cellulose compound having esterifiable hydroxyl groups with an esterifying reaction mixture comprising an organic acid anhydride, a diluent such as acetic acid, and a catalyst comprising from 0.2 to 2.0 parts phosphoric acid, preferably 0.6 to 1.5, most preferably 1.2 parts by weight, from 0.1 to 1.2 parts sulfuric acid, preferably 0.1 to 0.6, most preferably 0.4 parts, by weight, and from 0.1 to 0.6, preferably 0.1 to 0.4 parts, most preferably 0.3 parts, of a hindered secondary or tertiary aliphatic alcohol by weight per 100 parts of the cellulose compound. The weight ratio of all the liquids present to the cellulose to be esterified is between about 4:1 and about 10:1, preferably 4.0 to 7.5:1, most preferred 4.5 to 5.5:1. This lower total liquids to cellulose provides a saving in liquid raw material usage and reduces the energy required for liquid or diluent recovery. This use of small amounts of catalyst, relatively high esterification temperatures, and relatively low liquid-to-cellulose ratios is particularly efficient and therefore advantageous. The use of such small amounts of the particular catalyst mixture in the esterification of cellulose, for example, allows the reaction temperature to rise to between 75° C. and 110° C. without excessive degradation. Such reaction temperatures are desirable because (1) less cooling is required to maintain the temperature of the exothermic reaction within the desired reaction range than in processes where the reaction temperature must be maintained at a lower temperature range, and (2) less diluent is required to lower the viscosity of the product solution to a level which permits transfer of the solution from the reaction vessel.

The catalyst mixture may be used in amounts of from about 0.8 to about 3.0 parts by weight per 100 parts of the cellulose to be esterified. Preferably about 1.9 parts catalyst are used, with the optimum amount being dependent upon the quality of the cellulose to be esterified since the lower quality, more impure cellulose compound requires greater amounts of catalyst. The phosphoric acid and hindered secondary or tertiary aliphatic alcohol may be added before, after, or simultaneously with the sulfuric acid. It is preferred to pretreat the cellulose compound with the full catalyst mixture and a portion of the solvent for about one half to eight hours prior to the high temperature esterification reaction. This pretreatment assures uniform distribution of the catalyst mixture throughout the cellulose polymer and prepares the cellulose compound for the esterification reaction.

The hindered secondary or tertiary aliphatic alcohol can be, for example, tertiary butyl alcohol, isopropanol, 2-butanol, 3-benzyl-3-hydroxypentane, 1-phenyl-1-hydroxypropane, 1-methoxy-2-propanol, 4-hydroxy-2-pentene, and the like.

Although the process according to this invention is especially useful in the esterification of cellulose with low alpha-cellulose content, such as paper-grade wood pulp, it may be used in the esterification of any of the conventional types of cellulose with any of the lower fatty acid anhydrides. Such cellulose esters which can be prepared using the catalysts described herein are, for example, cellulose acetate, cellulose acetate propionate, cellulose acetate butyrate, cellulose propionate, and cellulose butyrate, and the like.

In the esterification process the cellulose wood pulp can be esterified in a mixture of acetic, propionic, and/or butyric acids (preferably about 1 to 3 parts per part of cellulose); and the anhydrides of any or all of these acids (about 2.5 to 4.0 parts per part of cellulose) using the novel catalyst system of the present invention. The reaction is carried out until a grain-free, good colored reaction solution is obtained. Sufficient water and lower fatty acid may then be added to convert the excess anhydride to the corresponding acid and to provide water in the reaction solution for hydrolysis. This aqueous lower fatty acid solution may also contain enough of a salt of a moderately strong base to neutralize all or a portion of the catalyst acids present in the reaction mixture. The ester is then hydrolyzed in the reaction solution to the desired degree. The temperature at which the hydrolysis is carried out may vary from 55° C. to 150° C., preferably 100° C. to 150° C., dependent upon the quality of the cellulose used to prepare the ester. In the preferred process, all of the catalyst is neutralized prior to hydrolysis. The cellulose ester, after hydrolysis, is then precipitated, washed, stabilized, and dried according to methods well known in the art.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 2100 ml of acetic acid is added to a 2.5 gallon heated stirred reactor. The heater and stirrer are activated and about 1.8 grams tertiary butyl alcohol (0.17 parts), about 7.2 grams phosphoric acid (0.68 parts), and 2.4 grams sulfuric acid (0.23 parts) are added to the reactor. About 1135 grams of air dried acetylation grade wood pulp chips having an alpha cellulose content of 95 percent or higher are then added and the reaction mixture is pretreated at a temperature of about 40° C. for a period of about 1 hour. About 2900 ml of acetic anhydride is then added and the temperature of the reaction mixture rises to a temperature of between 95° C. to 100° C. and the temperature is maintained between 95° C. and 100° C. for a period of about ¾ hour.

About 1500 parts of soft water, about 2900 ml of acetic acid and 12 grams of sodium acetate are then added to convert the excess anhydride to the corresponding acid, to provide water in the reaction solution for hydrolysis, and to neutralize the esterification catalyst. The ester is then hydrolized by maintaining the reaction mixture at a temperature of about 125° C. for about 250 minutes. The cellulose ester after hydrolysis is then precipitated, washed, stabilized, and dried according to methods well known in the art. The cellulose ester had 39.5 percent acetyl groups and an intrinsic viscosity in acetone of 1.52 cp at 25° C.

EXAMPLE 2

The procedure according to Example 1 is repeated except that the amount of sulfuric acid was 2.6 grams (0.25 parts), the amount of phosphoric acid was 7.8 grams (0.74 parts), and the amount of tertiary butanol was 2.0 grams (0.19 parts) and a viscose grade cellulose having an alpha cellulose content of 92 to 94 was used. The recovered cellulose ester had 39 percent acetyl and an intrinsic viscosity of 1.59 at 25° C.

EXAMPLE 3

The procedure according to Example 1 was repeated except that viscose grade pulp chips having an alpha cellulose content of about 92 to 95 were used and the amount of sulfuric acid was 2.4 grams (0.23 parts), the amount of phosphoric acid was 4.8 grams (0.45 parts), and the amount of tertiary butanol was 1.2 grams (0.11 parts) and acetylation was carried out at 99° C. for 61 minutes. The hydrolysis was carried out at 125° C. for 4 hours and 15 minutes. The recovered cellulose ester had an acetyl content of 39.2 percent and an intrinsic viscosity of 1.46 at 25° C.

EXAMPLE 4

About 2100 ml of acetic acid is added to a 2.5 gallon heated stirred reactor. The heater and stirrer are activated and about 1 gram tertiary butyl alcohol (0.09 parts), about 12 grams phosphoric acid (1.14 parts), and 2.1 grams sulfuric acid (0.2 parts) are added to the reactor. About 1135 grams of air dried paper grade wood pulp chips having an alpha cellulose content of 88 to 92 are then added and the reaction mixture is pretreated at a temperature of about 70° C. for a period of about 1.5 hours. About 2900 ml of acetic anhydride is then added and the temperature of the reaction mixture rises to a temperature of between about 95° C. to 100° C. and the temperature is maintained between 95° C. and 100° C. for a period of about 1¼ hours.

About 1500 parts of soft water, about 2900 ml of acetic acid and 12 grams of sodium acetate are then added to convert the excess anhydride to the corresponding acid, to provide water in the reaction solution for hydrolysis, and to neutralize the esterification catalyst. The ester is then hydrolyzed by maintaining the reaction mixture at a temperature of about 150° C. for about 90 minutes. The cellulose ester after hydrolysis is then precipitated, washed stabilized, and dried according to methods well known in the art. The cellulose ester had 38.9 percent acetyl groups and an intrinsic viscosity of 1.47 at 25° C.

EXAMPLE 5

About 2100 ml of acetic acid is added to a 2.5 gallon heated stirred reactor. The heater and stirrer are activated and about 3 grams tertiary butyl alcohol (0.28 parts), about 12 grams phosphoric acid (1.14 parts), and 6.1 grams sulfuric acid (0.58 parts) are added to the reactor. About 1135 grams of air dried paper grade wood pulp chips having an alpha cellulose content of 88 to 92 are then added and the reaction mixture is pretreated at a temperature of about 70° C. for a period of about 7 hours. About 2900 ml of acetic anhydride is then added and the temperature of the reaction mixture rises to a temperature of between 95° C. to 100° C. and the temperature is maintained between 95° C. and 100° C. for a period of about 1¾ hours.

About 1500 parts of soft water, about 2900 ml of acetic acid and 12 grams of sodium acetate are then added to convert the excess anhydride to the corresponding acid, to provide water in the reaction solution for hydrolysis, and to neutralize the esterification catalyst. The ester is then hydrolyzed by maintaining the reaction mixture at a temperature of about 150° C. for about 90 minutes. The cellulose ester after hydrolysis is then precipitated, washed, stabilized, and dried according to methods well known in the art. The cellulose ester had 38.9 percent acetyl groups and an intrinsic viscosity of 1.44 at 250° C.

The invention has been described in detail with respect to preferred embodiments thereof, but it will be understood that variations and modifications can be effected within the spirit and scope of the invention.

We claim:

1. A catalyst composition for esterifying cellulose with lower fatty acids which comprises from about 0.2 to 1.5 parts phosphoric acid, from about 0.1 to 1.2 parts sulfuric acid, and from 0.05 to 0.6 parts of a hindered aliphatic alcohol by weight per 100 parts of said cellulose to be esterified.

2. A method of preparing lower fatty acid esters of cellulose which comprises esterifying at a temperature of between about 75° C. and about 110° C. said cellulose with an esterifying bath comprising an organic acid anhydride, a diluent, and as the catalyst mixture comprising from about 0.2 to 1.5 parts phosphoric acid, from about 0.1 to 1.2 parts sulfuric acid, and from 0.05 to 0.6 parts of a hindered aliphatic alcohol by weight per 100 parts of said cellulose to be esterified.

3. A method according to claim 2 wherein the esterification is carried out at a temperature of about 90° C. to 105° C.

4. A method according to claim 3 wherein said sulfuric acid is present in an amount of about 0.1 to 0.6 percent based on the weight of said cellulose.

5. A method according to claim 4 wherein said phosphoric acid is present in an amount of about 0.6 to 1.2 percent based on the weight of said cellulose.

6. A method according to claim 5 wherein said hindered aliphatic alcohol is present in the amount of about 0.1 to about 0.4 percent based on the weight of said cellulose.

7. A method according to claim 6 wherein said hindered aliphatic alcohol is tertiary butanol.

* * * * *